US010348701B2

(12) United States Patent
Figueroa et al.

(10) Patent No.: US 10,348,701 B2
(45) Date of Patent: Jul. 9, 2019

(54) PROTECTING CLIENTS FROM OPEN REDIRECT SECURITY VULNERABILITIES IN WEB APPLICATIONS

(71) Applicant: Citrix Systems, Inc., Fort Lauderdale, FL (US)

(72) Inventors: Javier Alejandro Figueroa, Miramar, FL (US); Kenneth Scott Bowden, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 167 days.

(21) Appl. No.: 15/447,954

(22) Filed: Mar. 2, 2017

(65) Prior Publication Data

US 2018/0255068 A1    Sep. 6, 2018

(51) Int. Cl.
*H04L 29/06* (2006.01)
*H04L 29/08* (2006.01)

(52) U.S. Cl.
CPC ........ *H04L 63/0442* (2013.01); *H04L 63/126* (2013.01); *H04L 67/02* (2013.01); *H04L 67/2814* (2013.01)

(58) Field of Classification Search
CPC ............... H04L 63/107; H04L 63/1433; H04L 63/0435; H04L 63/061; H04L 63/062; H04L 63/0442
See application file for complete search history.

(56) References Cited

U.S. PATENT DOCUMENTS

| 2002/0099936 | A1* | 7/2002 | Kou | H04L 63/0442 |
| | | | | 713/151 |
| 2003/0182443 | A1* | 9/2003 | Wang | G06Q 20/3821 |
| | | | | 709/238 |
| 2003/0204719 | A1* | 10/2003 | Ben-Itzhak | G06F 21/51 |
| | | | | 713/152 |
| 2004/0003247 | A1* | 1/2004 | Fraser | H04L 29/06 |
| | | | | 713/169 |

(Continued)

OTHER PUBLICATIONS

Barth, Adam, "The Web Origin Concept"; Internet Engineering Task Force; RFC 6454; Dec. 2011, 40 pages.

(Continued)

*Primary Examiner* — Khoi V Le
(74) *Attorney, Agent, or Firm* — BainwoodHuang

(57) ABSTRACT

Described embodiments protect clients from open redirect security vulnerabilities in Web applications. A primary application receives a request for an operation to be performed on behalf of a secondary application. The request includes a return location parameter containing i) a return location, and ii) an encrypted portion. After completing the requested operation, the primary application retrieves the return location parameter and a cryptographic key uniquely associated with the secondary application. The primary application decrypts the encrypted portion of the return location parameter to generate a decrypted value, and uses the decrypted value to validate the return location contained in the return location parameter. The primary application transmits a redirect message to the client that causes the client to be redirected to the return location contained in the (Continued)

return location parameter only in response to the return location being successfully validated based on the decrypted value.

19 Claims, 7 Drawing Sheets

(56) References Cited

U.S. PATENT DOCUMENTS

2014/0230058 A1* 8/2014 Shulman ........... G06F 17/30306
726/23

OTHER PUBLICATIONS

Berners-Lee, et al., "Hypertext Transfer Protocol—HTTP/1.0"; Network Working Group; RFC 1945; May 1996, 60 pages.
Fielding, et al., "Hypertext Transfer Protocol—HTTP/1.1", Network Working Group; RFC 2616; Jun. 1999, 114 pages.
Fielding, et al., "Hypertext Transfer Protocol (HTTP/1.1); Semantics and Content", Internet Engineering Task Force; RFC 7231; Jun. 2014, 101 pages.
Galloway, Jon, "Preventing Open Redirection Attacks (C#)" Microsoft, Feb. 27, 2014 <<https://docs.microsoft.com/en-us/aspnet/mvc/overview/security/preventing-open-redirection-attacks>> accessed Jan. 18, 2017, 10 pages.
Hardt, Dick, "The OAuth 2.0 Authorization Framework", Internet Engineering Task Force; RFC 6749; Oct. 2012, 76 pages.
Pass, et al., "A Course in Cryptography", Cornell University, Jun. 2007, <<http://www.cs.cornell.edu/courses/cs4830/2008fa/lecnotes.pdf>> accessed Dec. 23, 2017, 196 pages.

* cited by examiner

PROTECTING CLIENTS FROM OPEN REDIRECT SECURITY VULNERABILITIES IN WEB APPLICATIONS

TECHNICAL FIELD

The present disclosure relates generally to the technical field of cyber security in networked computer systems, and more specifically to technology for protecting clients from open redirect security vulnerabilities in Web applications.

BACKGROUND

As it is generally known, the Hypertext Transfer Protocol (HTTP) is an application layer networking protocol that is a technical foundation for data communications in the World Wide Web (Web). HTTP defines a request-response protocol that is based on a client-server computing model. For example, a user agent such as a Web browser in an end user device may operate as a client, and an application providing a Website and running on a physical or virtual host server computer may operate as a server. HTTP defines the semantics of HTTP messages, including request methods, request header fields, response status codes, and response header fields, along with the body of HTTP messages. Web resources such as Web pages are generally identified and located in HTTP using Uniform Resource Locators (URLs), which are a type of Uniform Resource Identifier (URI).

When a client issues an HTTP request to a server, the server returns a response message containing a request completion status, and possibly containing the requested content within its message body. One type of response message defined by HTTP is a redirect message. A redirect message causes a recipient client to issue a request for a Web resource identified by a URL that is contained within the redirect message. In this way, a redirect message causes the client to be "redirected" to a Web resource that is located at a URL that is contained within the redirect message.

Some Web applications allow the HTTP requests that they process to specify a URL to which the client is to be redirected after the application performs one or more actions. Such applications are referred to herein as "redirecting" applications. Redirecting Web applications examine a query string portion of HTTP request messages they receive, in order to extract a URL from a predefined parameter contained within the query string of the request message. These applications redirect the client to the extracted URL after completing one or more requested actions. This type of query string parameter is referred to herein as a "return location parameter", and the URL that is extracted from this type of query string parameter in a request message is referred to herein as a "return location" URL. After a redirecting application completes the action or actions associated with the request message, the application then operates to redirect the client to the return location URL from the return location parameter in the request, i.e. by sending an HTTP redirect message containing the return location URL to the client.

SUMMARY

To address shortcomings arising in previous Web technologies, new technology is disclosed herein for protecting Web clients from open redirect security vulnerabilities in Web applications. In one aspect, a primary application receives a request from a client. The request indicates an operation to be performed on behalf of a secondary application, and includes a return location parameter containing i) a return location, and ii) an encrypted portion. The primary application stores the return location parameter from the request when the request is received, and then completes the requested operation. After completing the requested operation, the primary application retrieves the stored return location parameter and a cryptographic key that is uniquely associated with the secondary application. The primary application then generates a decrypted value by using the cryptographic key uniquely associated with the secondary application to decrypt the encrypted portion of the return location parameter, and uses the resulting decrypted value to determine whether the return location contained in the return location parameter is valid. For example, the primary application may compare a value generated from the return location contained in the return location parameter to the decrypted value. If the value generated from the return location contained in the return location parameter matches the decrypted value, then the return location contained in the return location parameter is valid. Otherwise, if the value generated from the return location contained in the return location parameter does not match the decrypted value, then the return location contained in the return location parameter is invalid.

The disclosed system prevents the client from being redirected to an invalid location by transmitting a redirect message from the primary application to the client that causes the client to be redirected to the return location contained in the return location parameter of the request only in response to the return location contained in the return location parameter being valid, as determined based on the decrypted value. Accordingly, if a malicious attacker causes a malicious return location to be present in a return location parameter of a request, the primary application will detect that the value generated from the return location contained in the return location parameter does not match the decrypted value generated from the encrypted portion of the return location parameter using the cryptographic key uniquely associated with the secondary application, and as a result the primary application will detect that the return location contained in the return location parameter is invalid. In response to detecting that the return location contained in in the return location is invalid, the disclosed system prevents transmission of a redirect message that would otherwise be transmitted from the primary application to the client, and that would cause the client to be redirected to a potentially malicious return location contained in the return location parameter. In this way, the disclosed system protects the client from being compromised by an attacker through an open redirect vulnerability.

In one example, the return location contained in the return location parameter may be a uniform resource locator (URL) of the secondary application, and the cryptographic key that is uniquely associated with the secondary application may be a public key of a public/private key pair uniquely associated with the secondary application. The encrypted portion of the return location parameter may have previously been encrypted by the secondary application using the private key of the public/private key pair uniquely associated with the secondary application, and then included in the return location parameter by the secondary application when the secondary application appended the return location parameter as a query string parameter to the URL of the primary application, within a redirect message transmitted from the secondary application to the client. As a result of the redirect message being transmitted from the secondary application to the client, the client was redirected to the primary application, thus causing the client to transmit the request to perform the operation on behalf of the secondary application to the primary application.

In another example, prior to receipt of the request to perform the operation on behalf of the secondary application, the primary application may internally generate the public/private key pair that is uniquely associated with the secondary application (e.g. in response to a registration request from the secondary application). The primary application may then convey (e.g. transmit) the private key of the public/private key pair of the secondary application to the secondary application for storage in the secondary application, and then destroy all copies of the private key that are stored in the primary application. As a result, the only copy of the private key of the public/private key pair uniquely associated with the secondary application is stored within the secondary application. The public key of the public/private key pair uniquely associated with the secondary application is stored in the primary application. In this way a trust relationship maybe established between the secondary application and the primary application.

In another example, the value generated from the return location contained in the return location parameter may be generated by applying a predetermined function (e.g. a hash function or the like) to the return location contained in the return location parameter, and the encrypted portion of the return location parameter may be a result of the secondary application encrypting, using the primary key of the public/private key pair of the secondary application, a result of applying the predetermined function to the uniform resource locator of the secondary application.

In another example, the primary application may perform the requested operation by transmitting a redirect message from the primary application to the client that causes the client to be redirected to a separate redirecting service application. The redirect message transmitted from the primary application to the client that causes the client to be redirected to the redirecting service application includes a return location query string parameter that contains a return location equal to a URL of the primary application. The primary application may then detect completion of the request operation when the redirecting service application subsequently causes the client to be redirected back to the primary application, i.e. when the client is redirected to the primary application as a result of a redirect message sent to the client from the redirecting service application with a location field containing the URL of the primary application.

In another example, the primary application may store the return location parameter from the request by storing the return location parameter within a Web cookie, such as a session cookie that is sent to and stored in the client (e.g. that is sent to the client when the primary application redirects the client to the redirecting service application that is used by the primary application to perform the requested service). The primary application may then retrieve the stored return location parameter by retrieving the session cookie when the redirecting service application causes the client to be redirected to the primary application, e.g. from a request message received by the primary application as a result of the redirecting service application redirecting the client to the primary application.

The operation to be performed on behalf of the secondary application may include one or more actions that are delegated to the primary application from one or more secondary applications. For example, an operation to be performed on behalf of the secondary application may include authenticating a user of the client in response to the client accessing the secondary application, and completing the operation may include successfully authenticating the user of the client by the primary application and/or by the redirecting service application, or determining by the primary application and/or by the redirecting service application that the user of the client cannot be authenticated.

BRIEF DESCRIPTION OF THE DRAWINGS

The foregoing and other objects, features and advantages will be apparent from the following description of particular embodiments, as illustrated in the accompanying drawings in which like reference characters refer to the same parts throughout the different views. The elements of the drawings are not necessarily drawn to scale, emphasis instead being placed upon illustrating the principles of the various embodiments.

DETAILED DESCRIPTION

Figure 1:
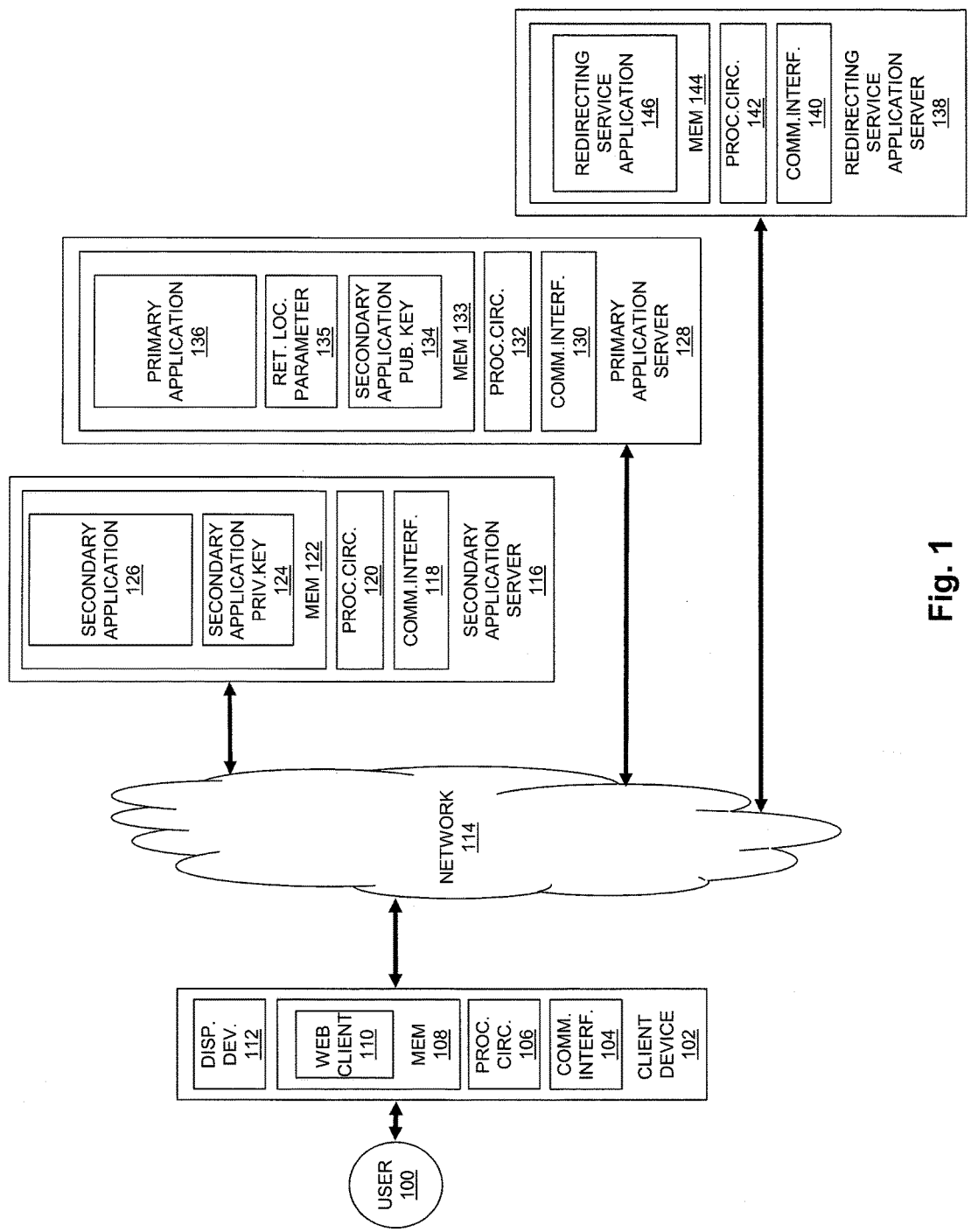
FIG. 1 is a block diagram showing an example of devices in an operational environment of an illustrative embodiment.

Embodiments will now be described with reference to the figures. It should be understood that such embodiments are provided only by way of example and to illustrate various features and principles, and that the scope of the claims is not limited to the specific example embodiments described herein.

The individual features of the particular embodiments, examples, and implementations described herein can be combined in any manner that makes technological sense. Moreover, such features are hereby combined to form all possible combinations, permutations and variants except to the extent that such combinations, permutations and/or variants have been explicitly excluded or are technically impractical. Support for such combinations, permutations and variants is considered to exist in this document.

Unfortunately, the use of HTTP redirect messages by redirecting Web applications to redirect clients has given rise to a cyber-security problem known as "open URL redirects." Specifically, in existing systems, a redirecting application may process an HTTP request messages that it receives by performing one or more actions, and then simply redirecting the client to a return URL provided in a query string parameter of the request. As a result, an attacker can tamper with the contents of a request that is sent to the redirecting application, in order to cause the client to be redirected to a malicious Web page that is under the control of the attacker. This vulnerability can be exploited in various ways, including "phishing" attacks that surreptitiously obtain a user's authentication credentials when the user's client software (e.g. a Web browser) is redirected to the malicious Web page. In general, an open redirect vulnerability is present in any redirecting application that takes a return location URL from a query string parameter in an HTTP request, and then redirects the requesting client to the return location URL without any validation of the return location URL, or without sufficient validation of the return location URL.

For example, an attacker may exploit an open redirect by sending a "phishing" email to the user that requests the user to log in to a Web site that the user is familiar with (e.g. www.FamiliarWebSite.com), and that includes a link to the login page for the familiar Web site, but that also has a query string parameter indicating a return location URL that is under the control of the attacker:
http://FamiliarWeb Site.com/Account/LogOn?returnUrl=http://FamilarWeb Site.com/Account/LogOn As shown above, a return location parameter may be contained in a query string of the URL located after the ? separator. In the above example, the return location parameter is indicated by a field name of "returnUrl", and has a value of http://FamilarWebSite.com/Account/LogOn. The return URL parameter points to "FamilarWebSite.com", which is missing the "i" from the word "familiar", and is a domain that is under the control of the attacker. If the user receiving the email message follows the instructions given by the attacker in the email message and clicks on the link, then the user's client will first be directed to the legitimate login Web page for FamiliarWebSite.com. However, if an open URL redirect vulnerability is present in the login page used by www.FamiliarWebSite.com, after the user logs in correctly to FamiliarWebSite.com, the user's client will be redirected to the return location URL that is controlled by the attacker, causing a fake login Web page to be loaded into the client. The user may not notice the difference between the legitimate and fake login Web pages, since the fake login Web page can be designed to look like the legitimate login Web page of the familiar Web site. The fake login Web page may request that the user login again, e.g. stating that the user mistyped their password. If the user complies with the request by logging in again, now through the fake login Web page, the user's login credentials can be captured and stored for use by the attacker. The fake login Web page can then pass control to the legitimate Web site FamiliarWebSite.com, to which the user has previously successfully logged in, without making the user aware that their credentials have been stolen.

To address the above described and other shortcomings arising in previous Web technologies, new technology is described herein for protecting clients from open redirect security vulnerabilities in Web applications. The technology described herein provides significant advantages over previous solutions. First, the technology prevents a client from being redirected to an invalid location due to an open redirect vulnerability. As a result, phishing and other types of attacks that rely on open redirect vulnerabilities are successfully avoided. The disclosed technology also eliminates the need for a redirecting application (such as the primary application or a separate redirecting service application) to maintain a "white list" of valid locations to which a client may be redirected upon completion of a requested operation. Such white lists consume resources of the underlying computer systems including memory and/or non-volatile storage, and accurately maintaining such white lists may require the use of significant amounts of processing and/or I/O resources. Eliminating the requirement for a redirecting application to maintain and routinely check a white list of valid return locations in the primary application and/or another redirecting service application results in improved performance for the underlying computer or computers on which the applications are hosted, both in terms of memory and/or storage resources, as well as processing and/or I/O resources.

FIG. 1 is a block diagram showing an example of devices in an operational environment. As shown in FIG. 1, a Client Device 102 may include Communication Interfaces 104, Processing Circuitry 106, Memory 108, and a Display Device 112. Communication Interfaces 104 may include one or more network interfaces and/or interfaces to I/O devices, that enable Client Device 102 to communicate over one or more computer networks, including Network 114. Processing Circuitry 106 may include one or more computer processors, such as a central processing unit (CPU) or microprocessor, and associated circuitry. Memory 108 may include volatile memory (e.g., RAM) and/or non-volatile storage, and/or another type of computer readable medium, that is operable to store program code that is executable on the Processing Circuitry 106, and that may be operable to store data operated on by such program code.

In the example of FIG. 1, Memory 108 stores a Web Client 110, such as a Web browser or the like, that is used by a User 100 to navigate between various Web resources, such as Web sites and/or services provided by Web applications. Client Device 102 may be a mobile device, such as a smartphone, laptop, or tablet computer, or another type of client device, such as a desktop computer. As further described below, during operation, Web Client 110 may be redirected from Secondary Application 126 to Primary Application 136, and possibly also to Redirecting Service Application 146, for performance of one or more operations on behalf of Secondary Application 126, and then safely redirected back to Secondary Application 126, without exposure to cyber-attacks that exploit an open redirect vulnerability.

A Secondary Application Server 116, a Primary Application Server 128, and a Redirecting Application Server 138 are also shown communicably coupled to Network 114. Each one of Secondary Application Server 116, Primary Application Server 128, and Redirecting Application Server 138 may also include communication interfaces, processing circuitry and memory. In the example of FIG. 1, Secondary Application Server includes Communication Interfaces 118, Processing Circuitry 120, and Memory 122, Primary Application Server 128 includes Communication Interfaces 130, Processing Circuitry 132, and Memory 133, and Redirecting Application Server 138 includes Communication Interfaces 140, Processing Circuitry 142, and Memory 144. Communication Interfaces 118, 130 and 140 may each include one or more network interfaces that enable the respective application server to communicate over Network 114. Processing Circuitry 120, 132, and 142 may each include one or more computer processors, such as a central processing unit (CPU) or microprocessor, and associated circuitry. Memory 122, 133 and 144 may each include volatile memory (e.g., RAM) and/or non-volatile storage, and/or another type of computer readable medium, for storing program code that is executable on the processing circuitry of the respective application server, and for storing data operated on by such program code. Secondary Application Server 116, Primary Application Server 128, and/or Redirecting Application Server 138 may each be embodied as or within one or more hardware server computer systems, such as, for example, within one or more rack-mounted server computers or the like. Alternatively, Secondary Application Server 116, Primary Application Server 128, and/or Redirecting Application Server 138, may be embodied as or within one or more virtual servers, such as one or more virtual private servers or the like.

In the example of FIG. 1, Memory 122 of Secondary Application Server 116 stores a Secondary Application 126 and a Secondary Application Private Key 124. Secondary Application 126 is a Web server application that provides a Web site and/or service to one or more clients over Network 114, using HTTP. For example, Secondary Application 126 may provide a Web site, and/or a file sharing service, a virtual application, virtual desktop, or virtual server, and/or another specific type of service. Secondary Application Private Key 124 is an example of a private key that is uniquely assigned to Secondary Application 126. The use of Secondary Application Private Key 124 by Secondary Application 126 is described below.

Also in the example of FIG. 1, Memory 133 of Primary Application Server 128 stores a Primary Application 136, a Return Location Parameter 135, and a Secondary Application Public Key 134. Primary Application 136 is a Web server application that performs one or more operations on behalf of one or more secondary applications, including Secondary Application 126. For example, Primary Application 136 may provide an authentication service to Secondary Application 126, e.g. when a client requests access the Web site and/or service that is provided by Secondary Application 126. Such an authentication service may be used by Secondary Application 126 to authenticate a user of a Web client that has requested access to the Web site and/or service that is provided by Secondary Application 126. Return Location Parameter 135 is an example of a return location parameter that is stored by Primary Application 136 while performing an operation on behalf of Secondary Application 126, as further described below. Secondary Application Public Key 134 is an example of a public key uniquely associated with Secondary Application 126, the use of which by Primary Application 136 is further described below.

Further in the example of FIG. 1, Memory 144 of Redirecting Service Application Server 138 includes a Redirecting Service Application 146. Both Redirecting Service Application 146 and the Primary Application 136 are examples of redirecting Web applications. In some embodiments, Primary Application 136 may use Redirecting Service Application 146 to perform one or more requested operations on behalf of Secondary Application 126. For example, as further described below, when the requested operation is authentication of a user of Web Client 110, Primary Application 136 may use Redirecting Service Application 146 on behalf of Secondary Application 126 to authenticate a user of Web Client 110 prior to allowing Web Client 110 to access a Web site and/or service provided by Secondary Application 146.

Although certain software constructs are specifically shown in FIG. 1, those skilled in the art will recognize that Memory 108, Memory 122, Memory 133, and Memory 144 may also include other software constructs, which are not shown, such as an operating system and/or various other applications, and/or middleware, utilities, libraries, etc.

Figure 2:
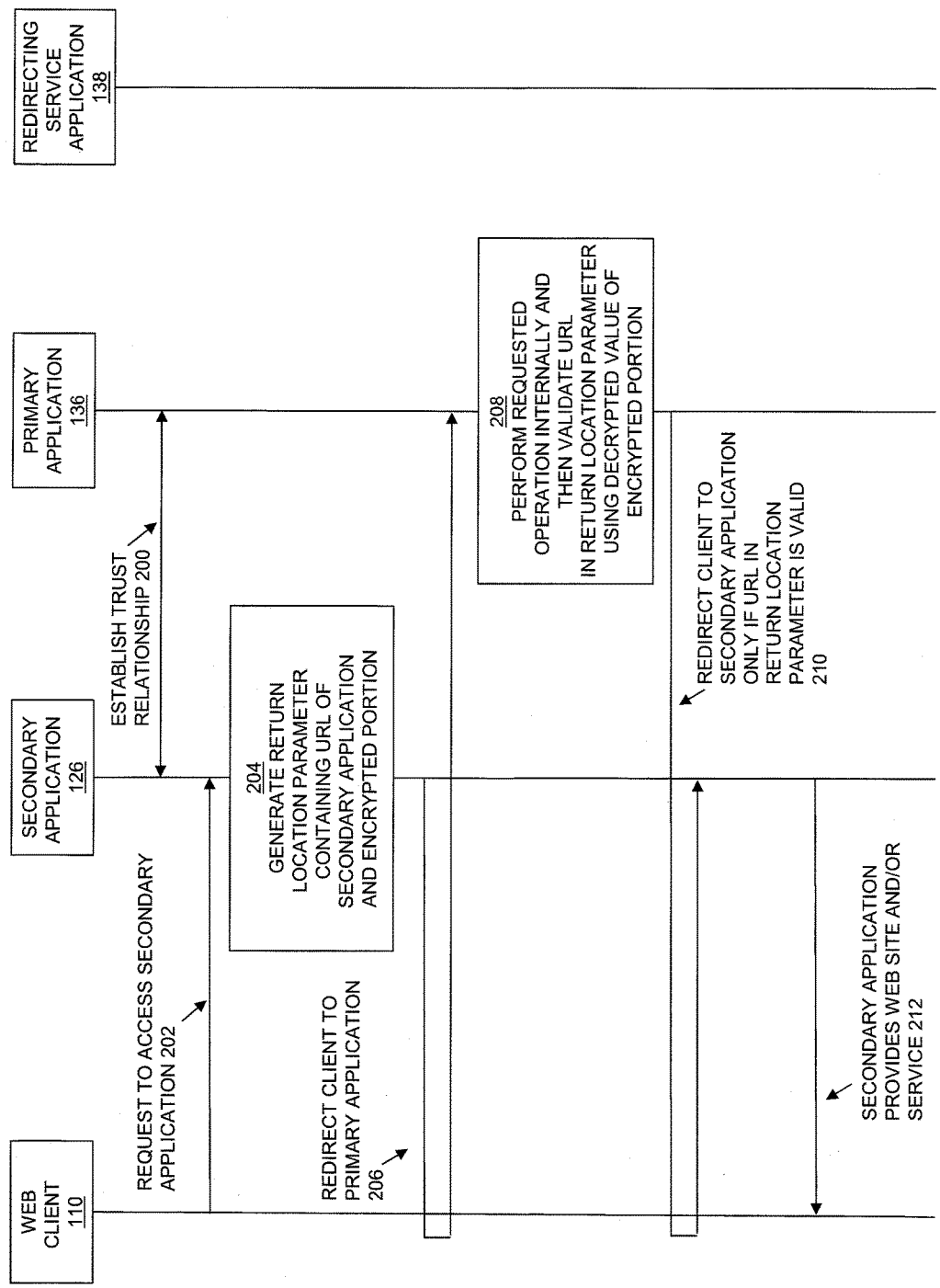
FIG. 2 is a sequence diagram illustrating a first example of operation of an illustrative embodiment, in which a return location (e.g. URL) contained in a return location parameter of a request is successfully validated by a primary application using a decrypted value of an encrypted portion of the return location parameter, resulting in a redirect message being sent to the Web client to redirect the Web client to the URL contained in the return location parameter.

FIG. 2 is a sequence diagram illustrating an example of operation. In the example of FIG. 2, a return location (e.g. URL) in a return location parameter is successfully validated by Primary Application 136 using a decrypted value of an encrypted portion of the return location parameter, resulting in a redirect message being sent to the Web Client 110 to redirect the Web Client 110 to the return location in the return location parameter.

As shown in FIG. 2, at 200 a trust relationship is established between Secondary Application 126 and Primary Application 136. For example, Secondary Application 126 may be one of multiple secondary applications that each perform a registration operation to establish a trust relationship with Primary Application 136, such that Primary Application 136 can subsequently be used to safely perform an operation on behalf of each one of the secondary applications that has previously registered with Primary Application 136. In one embodiment, a trust relationship between Secondary Application 126 and Primary Application 136 is established in response to Secondary Application 126 sending a registration request to Primary Application 136. In response to the registration request, Primary Application 136 may internally generate a public/private cryptographic key pair that is uniquely assigned to the secondary application. The public/private cryptographic key pair generated by Primary Application 136 is an asymmetric key pair, i.e. data encrypted using the private key of the key pair can only be decrypted using the public key of the key pair, and data encrypted using the public key of the key pair can only be decrypted using the private key of the key pair.

Primary Application 136 may then convey (e.g. securely transmit) the private key of the public/private key pair to Secondary Application 126. The private key of the public/private key pair may then be stored in Memory 122 by Secondary Application 126, as shown in FIG. 1 by Secondary Application Private Key 124. Primary Application 136 destroys all copies of the private key of the public/private key pair uniquely assigned to Secondary Application 126 that were stored in Memory 133. As a result, Secondary Application Private Key 124 is the only remaining copy of the private key of the public/private key pair assigned to Secondary Application 126.

Primary Application 136 maintains a copy of the public key of the public/private key pair uniquely assigned to Secondary Application 126, as shown in FIG. 1 by Secondary Application Public Key 134. In this way, a trust relationship may be established between one or more secondary applications (e.g. consisting of or including Secondary Application 126) and the Primary Application 136.

At 202 Web Client 110 requests access to Secondary Application 126, e.g. requests access to a Web site and/or service that is provided by Secondary Application 126. For example, at 202 the Web Client 110 may request access to a Web site and/or service that is provided by Secondary Application 126, by sending an HTTP GET request message to Secondary Application 126 containing a URL of a Web resource provided by the Secondary Application 126, e.g. a URL of a Web site and/or service that is provided by Secondary Application 126.

At 204, in response to receipt of the request from Web Client 110 to access Secondary Application 126, Secondary Application 126 generates a return location parameter that contains a return location and an encrypted portion. For example, the return location parameter generated by the Secondary Application 126 may contain a return location that is the URL of the Secondary Application 126, and an encrypted portion. The Secondary Application 126 may, for example, generate the encrypted portion of the return location parameter by using the private key uniquely assigned to the Secondary Application 126 (e.g. Secondary Application Private Key 124 in FIG. 1) to encrypt a result of applying a predetermined function to the URL of the Secondary Application 126. For example, Secondary Application 126 may generate the encrypted portion of the return location parameter by using the private key uniquely assigned to Secondary Application 126 to encrypt the result of applying a cryptographic hash function (e.g. SHA-256 or another cryptographic hash function) to the URL of Secondary Application 126.

At 206 the Secondary Application 126 redirects the Web Client 110 to Primary Application 136, so that Primary Application 136 can perform one or more operations on behalf of Secondary Application 126. For example, Secondary Application 126 appends the return location parameter generated at 204 as a query string parameter to the URL of the Primary Application 136, and then stores the resulting URL into an HTTP redirect message, e.g. within the Location field of an HTTP redirect response message having a status code of 302. The HTTP redirect response message used by Secondary Application 126 to redirect the Web Client 110 to Primary Application 136 at 206 also indicates the operation or operations to be performed by Primary Application 136 on behalf of Secondary Application 126 (e.g. authentication of a user of Web Client 110). The HTTP redirect response message used by Secondary Application 126 to redirect Web Client 110 to Primary Application 136 is sent from Secondary Application 126 to the Web Client 110, and causes Web Client 110 to send Primary Application 136 an HTTP GET request message i) that contains the URL of the Primary Application 136 (e.g. in the Host field of the message) with the return location parameter generated by the Secondary Application 126 appended as a query string parameter, and ii) that indicates the operation or operations to be performed by Primary Application 136 on behalf of the Secondary Application 126.

At 208 the Primary Application 136 receives the HTTP GET request message sent from the Web Client 110, extracts the return location parameter generated by Secondary Application 126 from the query string appended to the URL of the Primary Application 136 contained in the request, and stores the return location parameter in a way that allows the return location parameter to be retrieved later. For example, Primary Application 136 may store the extracted return location parameter locally, as shown by Return Location Parameter 135 shown in FIG. 1. Alternatively, Primary Application 136 may store the extracted return location parameter in a Web cookie, such as a session cookie, that is stored within the Web Client 110.

After storing the extracted return location parameter, Primary Application 136 performs the one or more operations indicated by the request message that are to be performed on behalf of the Secondary Application 126. In the example of FIG. 2, Primary Application 136 performs the requested operation or operations internally, without using Redirecting Service Application 138. For example, when the operation to be performed on behalf of the Secondary Application 126 is authentication of a user of Web Client 110, Primary Application 136 may perform one or more authentication operations to attempt to authenticate the user of Web Client 110. Alternatively, Secondary Application 126 may determine internally that the user of Web Client 110 has previously been authenticated, and that no further authentication operations are required.

Authentication operations performed to authenticate the user of Web Client 100 may include requesting that the user of Web Client 110 provide one or more pieces of information to Primary Application 136 (e.g. through Web Client 110) that can be used by Primary Application 136 and/or Redirecting Service Application 138 to perform single factor authentication, two factor authentication, and/or some other specific type of authentication procedure. For example, information obtained from the user by Primary Application 136 and/or Redirecting Service Application 138 through Web Client 110, and used by Primary Application 136 and/or Redirecting Service Application 138 to authenticate the user may include a username, passphrase, password, personal identification number, one-time password, and/or other specific type of information.

In the example of FIG. 2, after the requested operation is completed internally by Primary Application 136, Primary Application 136 retrieves the previously stored return location parameter. For example, Primary Application 136 may retrieve a locally stored copy of the return location parameter (e.g. Return Location Parameter 135 shown in FIG. 1). Alternatively, the Primary Application 136 may retrieve a copy of the return location parameter that was previously stored in a Web cookie, such as a session cookie, stored in Web Client 110. Primary Application 136 generates a decrypted value by decrypting the encrypted portion of the return location parameter using the public key uniquely assigned to the Secondary Application 126. Primary Application 136 uses the decrypted value to determine whether the return location contained in the return location parameter is a valid return location, e.g. by comparing the decrypted value to a value generated from the return location contained in the return location parameter. For example, Primary Application 136 may generate a value from the return location contained in the return location parameter by applying the predetermined function to the return location contained in the return location parameter, and then compare the value generated from the return location contained in the return location parameter to the decrypted value. The predetermined function applied by the Primary Application 136 to the return location in the return location parameter must be the same predetermined function that was applied by the Secondary Application 126 to the URL of the Secondary Application 126 at 204 when generating the encrypted portion of the return location parameter (e.g. the same cryptographic hash function, such as SHA-256 or another cryptographic hash function). Accordingly, establishing the trust relationship between Secondary Application 126 and Primary Application 136 at 200 may also include storing an indication of the predetermined function in both Primary Application 136 and Secondary Application 126.

Alternatively, the value generated by the Primary Application 136 when applying the predetermined function to the return location contained in the return location parameter may be the value of the return location itself, e.g. the URL of Secondary Application 126 in FIG. 2. In such an embodiment, the predetermined function applied by Secondary Application 126 to the URL of Secondary Application 126 at 204 when generating the encrypted portion of the return location parameter, and that is also applied by Primary Application 136 to the return location of the request to generate the value that is compared to the decrypted value when attempting to validate the return location, may simply return the URL of Secondary Application 126 when applied by Secondary Application 126, and return the value of the return location when applied by Primary Application 136.

Primary Application 136 determines that the return location contained in the return location parameter is a valid return location only in response to detecting at 208 that the value generated from the return location contained in the return location parameter matches the decrypted value. Otherwise, in response to detecting that the value generated from the return location contained in the return location parameter does not match the decrypted value, Primary Application 136 determines that the return location contained in the return location parameter is not a valid return location (i.e. is an "invalid" return location). Primary Application 136 prevents the Web Client 110 from being redirected to an invalid location, by transmitting an HTTP redirect message to the Web Client 110 that causes Web Client 110 to be redirected to the return location contained in the return location parameter only in response to detecting that the decrypted value matches the value generated from the return location contained in the return location parameter. In other words, at 210 the Primary Application 136 redirects the Web Client 110 to the Secondary Application 126 only if the return location (e.g. the URL of Secondary Application 126) is determined to be valid based on the comparison of the decrypted value to the value generated from the return location.

In the example of FIG. 2, since the return location parameter was generated by Secondary Application 126 at step 204, and includes a return location that is the URL of Secondary Application 126, and an encrypted portion generated using the private key uniquely assigned to Secondary Application 126, and was conveyed to Primary Application 135 when the Web Client 110 was redirected by Secondary Application 126 to Primary Application 136 at 206, at 208 the Primary Application 136 detects that the decrypted value matches the value generated from the return location contained in the return location parameter. Accordingly, in the example of FIG. 2, the URL of Secondary Application 126 that is the return location contained in the return location parameter is determined to be a valid return location, and at 210 Primary Application redirects Web Client 110 to the Secondary Application 126, so that Web Client 110 can access the Web site or service provided by Secondary Application 126, e.g. in the event that the user of Web Client 110 was successfully authenticated. For example, Primary Application 136 may store the URL of Secondary Application 126 that was the return location from the return location parameter processed at step 208 into an HTTP redirect message, e.g. within the Location field of an HTTP redirect response message having a status code of 302, and then transmit the HTTP redirect message to Web Client 110 at 210. The HTTP redirect response message transmitted to Web Client 110 may also include a result of the operation or operations performed by Primary Application 136 on behalf of Secondary Application 126 (e.g. authentication success, authentication failure, etc.), that is then passed from Web Client 110 to Secondary Application 126 when Web Client 110 is redirected to Secondary Application 126. The HTTP redirect response message sent from Primary Application 136 to the Web Client 110 at 210 causes Web Client 110 to send Secondary Application 126 an HTTP GET request message that contains the result of the operation or operations performed by Primary Application 136 on behalf of Secondary Application 126. For example, if the result of the operation performed by Primary Application 136 was successful authentication of a user of Web Client 110 (e.g. of User 100 shown in FIG. 1), then at 212 Secondary Application 126 responds to the HTTP GET request message resulting from the Web Client 110 being redirected to the Secondary Application 126 at 210 by providing the Web Client 110 with the Web site and/or service that is provided by Secondary Application 126.

Alternatively, in a case in which the requested operation fails, e.g. when the result of an authentication operation performed by Primary Application 136 on behalf of Secondary Application 126 is an authentication failure because the user of the Web Client 110 cannot be authenticated, such a failure status may be reported to Secondary Application 126 by Primary Application 136 through the redirection of Web Client 110 at 210, and Secondary Application 126 may as a result deny Web Client 110's request to access the Web site and/or service provided by Secondary Application 126.

Figure 3:
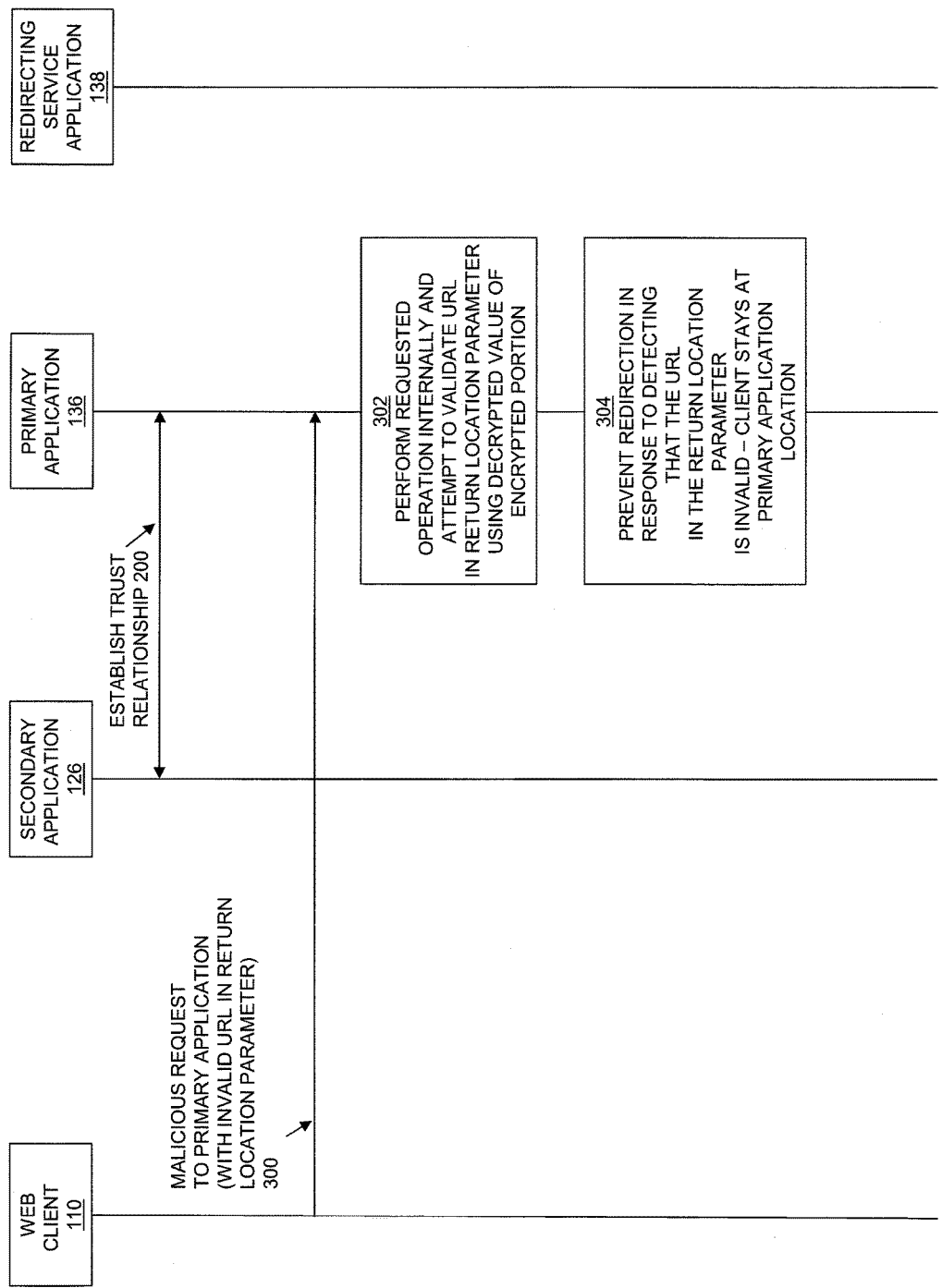
FIG. 3 is a sequence diagram illustrating a second example of operation of an illustrative embodiment, in which a return location (e.g. URL) contained in a return location parameter of a request is determined to be invalid by a primary application using a decrypted value of an encrypted portion of the return location parameter, causing the primary application to prevent sending of a redirect message to the Web client that would redirect the Web client to the return location contained in the return location parameter.

FIG. 3 is a sequence diagram illustrating a second example of operation, in which a return location (e.g. URL) contained in a return location parameter of a request is determined to be invalid by Primary Application 136 based on a decrypted value of an encrypted portion of the return location parameter, causing the Primary Application 136 to prevent the sending of a redirect message to the Web Client 110 that would redirect the client to a malicious URL. As shown in the example of FIG. 3, at 200 a trust relationship is established between Secondary Application 126 and Primary Application 136 as described above with reference to FIG. 1. At 300 a malicious request is transmitted from Web Client 110 to Primary Application 136. For example, such a malicious request may be an HTTP GET request message containing a return location query string parameter that contains a return location that is a URL of a Web site that is under the control of an attacker. If Primary Application 136 were to simply perform the operation indicated by such a malicious request and then redirect the Web Client 110 to the URL contained in the return location parameter, Web Client 110 would be exposed to an open redirect vulnerability. However, redirection of Web Client 110 to the Web site under control of the attacker is prevented as further described herein.

At step 302, Primary Application 136 receives the malicious HTTP GET request message sent from the Web Client 110, and extracts a return location parameter inserted by a malicious attacker from the query string of the URL of Primary Application 136 that is contained in the request message, and stores the extracted return location parameter in a way that allows the return location parameter to be retrieved later, as described above. After storing the extracted return location parameter, Primary Application 136 may perform one or more operations indicated by the request message. In the example of FIG. 2, Primary Application 136 performs one or more requested operations internally, such as authenticating the user of Web Client 110, without using Redirecting Service Application 138. After the requested operation is completed internally by Primary Application 136, Primary Application 136 retrieves the previously stored return location parameter, and then attempts to validate the return location contained in the return location parameter by first decrypting an encrypted portion of the return location parameter using a public key uniquely assigned to a secondary application indicated by the request, such as Secondary Application 126, in order to generate a decrypted value. For example, Primary Application 136 may determine that the malicious request message resulted from a redirection of Web Client 110 from Secondary Application 126 to Primary Application 136. Primary Application 136 would therefore attempt to validate the return location contained in the return location parameter by decrypting an encrypted portion of the return location parameter using a public key uniquely assigned to Secondary Application 126, in order to generate a decrypted value. Primary Application 136 then uses the decrypted value to determine whether the return location contained in the return location parameter is a valid return location by comparing the decrypted value to a value generated from the return location contained in the return location parameter, as described above with reference to 208 in FIG. 2. Advantageously, a value generated from a return location contained in a return location parameter can only match a decrypted value generated by decrypting an encrypted portion of the return location parameter using a public key of a secondary application when the encrypted portion of the return location parameter was generated by the same secondary application using the private key of the public/private key pair uniquely assigned to that secondary application. In the case of the malicious request of FIG. 3, the malicious attacker has no access to the private key of the public/private key pair uniquely assigned to Secondary Application 126, and therefore cannot use that private key to generate an encrypted portion of the return location parameter in the malicious request. Accordingly, when the encrypted portion is decrypted using the public key of the public/private key pair uniquely assigned to Secondary Application 126, it would not generate a decrypted value that would match a value generated from the malicious return location (e.g. URL) contained in the return location parameter of the malicious request. Accordingly, in the example of FIG. 3, at 302 the Primary Application 136 determines that the malicious return location in the return location parameter is not a valid return location, and is an therefore an "invalid" return location, in response to detecting that the value generated from the malicious return location contained in the return location parameter does not match the decrypted value. In response to detecting that the value generated from the malicious return location contained in the return location parameter does not match the decrypted value, at 304 the Primary Application 136 prevents Web Client 110 from being redirected to the malicious return location, and Web Client 110 remains navigated to the Primary Application 136, and content provided from Primary Application 136 may be loaded into and displayed by Web Client 110, but no access is provided to the Web site and/or service that is provided by Secondary Application 126. Primary Application 136 may also report the failure to validate the return location to the user of Web Client 110, so that the user may be made aware of the attempted attack. Primary Application 136 may also keep a log of such failures to validate return locations, and/or store the invalid return location in a "black list" of locations that are believed to be under the control of malicious attackers.

Figure 4:
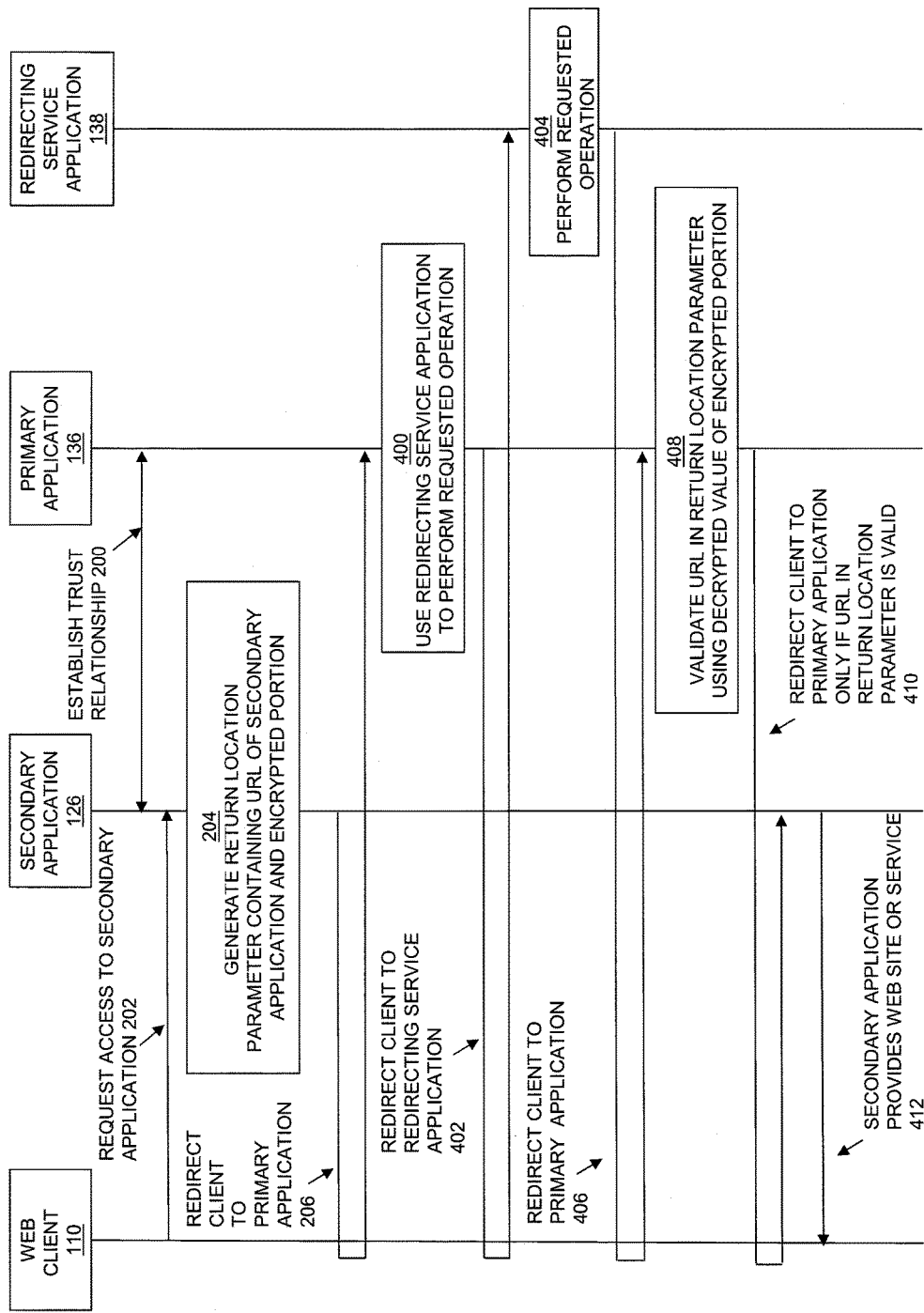
FIG. 4 is a sequence diagram illustrating a third example of operation of an illustrative embodiment, in which a redirecting service application is used by the primary application to complete a requested operation, after which the return location (e.g. URL) contained in the return location parameter of a request is successfully validated by the primary application using a decrypted value of an encrypted portion of the return location parameter, resulting in a redirect message being sent to the Web client that redirects the Web client to the return location contained in the return location parameter.

FIG. 4 is a sequence diagram illustrating a third example of operation, in which Redirecting Service Application 138 is used by Primary Application 136 to complete a requested operation, after which the return location (e.g. URL) contained in the return location parameter of the request message is successfully validated by Primary Application 136 using a decrypted value of an encrypted portion of the return location parameter, resulting in a redirect message being sent from Primary Application 136 to the Web Client 110 that redirects the Web Client 110 to the return location contained in the return location parameter (e.g. to Secondary Application 126).

In the example of FIG. 4, the operation in steps 200, 202, 204, and 206 is the same as described above with reference to FIG. 1. At 400, Primary Application 136 responds to receipt of the HTTP Get request from Web Client 110 in 206 by storing the return location parameter from the request in a way that allows the return location parameter to be retrieved later, as described above, and by then using Redirecting Service Application 138 to perform the requested operation or operations, i.e. by redirecting Web Client 110 to the Redirecting Service Application 138 at 402. For example, at 402 the Primary Application 136 may append a return location query string parameter containing its own URL as the return location the URL of the Redirecting Service Application 138, and then store the resulting URL into an HTTP redirect message, e.g. within the Location field of an HTTP redirect response having a status code of 302 that is used to redirect Web Client 110 to the Redirecting Service Application 138 at 402. The HTTP redirect response message also indicates the operation or operations to be performed by Redirecting Service Application 138 on behalf of Secondary Application 126. In an embodiment in which Primary Application 136 stores the return location parameter in a session cookie that is stored in Web Client 110, the session cookie may also be included by Primary Application 136 in the HTTP redirect response message sent by Primary Application 136 to Web Client 110 at 402 to redirect Web Client 110 to the Redirecting Service Application 138. Such a session cookie would subsequently be made available by Web Client 110 for retrieval by Primary Application 136 when Redirecting Service Application 138 redirects Web Client 110 to the Primary Application 136 at 406 after performing the requested operation at 404.

The HTTP redirect response message used by Primary Application 136 at 402 to redirect Web Client 110 to Redirecting Service Application 138 is sent from Primary Application 136 to the Web Client 110, and causes Web Client 110 at 402 to send Redirecting Service Application 138 an HTTP GET request message indicating the operation to be performed on behalf of the Secondary Application 126 (e.g. authentication of a user of Web Client 110), and containing a URL of the Redirecting Service Application 138 (e.g. in the Host field of the message) with a return location parameter containing the URL of Primary Application 136 as a return parameter appended as a query string parameter.

At 404 Redirecting Service Application 138 performs the requested operation on behalf of Secondary Application 126 (e.g. authenticates the user of Web Client 110), and then at 406 redirects Web Client 110 to the Primary Application 136. At 408, Primary Application 136 detects that the requested operation has been completed in response to Web Client 110 being redirected from Redirecting Service Application 138 to the Primary Application 136, and then retrieves the previously stored return location parameter, e.g. from a locally stored copy of the return location parameter, or from a copy of the return location parameter stored in a Web cookie, such as a session cookie, that is stored in Web Client 110. Since the requested operation or operations were performed by Redirecting Service Application 138, content from the Primary Application 136 may not need to be displayed by Web Client 110 at step 408. As described above with reference to 208 in FIG. 2, at 408 the Primary Application 136 then generates a decrypted value by decrypting the encrypted portion of the return location parameter using the public key uniquely assigned to the Secondary Application 126, and uses the decrypted value to determine whether the return location contained in the return location parameter is a valid return location, e.g. by comparing the decrypted value to a value generated from the return location contained in the return location parameter. In the example of FIG. 4, since the return location parameter was generated by Secondary Application 126 at step 204, and includes a return location that is the URL of Secondary Application 126, and an encrypted portion generated by Secondary Application 126 using the private key uniquely assigned to Secondary Application 126, and was conveyed to Primary Application 135 when the Web Client 110 was redirected by Secondary Application 126 to Primary Application 136 at 206, at 408 the Primary Application 136 detects that the decrypted value matches the value generated from the return location contained in the return location parameter. The URL of Secondary Application 126 contained in the return location parameter is therefore determined to be a valid return location, and at 410 Primary Application redirects Web Client 110 to the Secondary Application 126, so that Web Client 110 can access the Web site or service provided by Secondary Application 126 (e.g. in the event that the user of Web Client 110 was successfully authenticated by Redirecting Service Application 138). At 412 Secondary Application 126 responds to an HTTP GET request message received from the Web Client 110 when Web Client 110 was redirected to Secondary Application 126 by providing the Web Client 110 with the Web site and/or service provided by Secondary Application 126.

Figure 5:
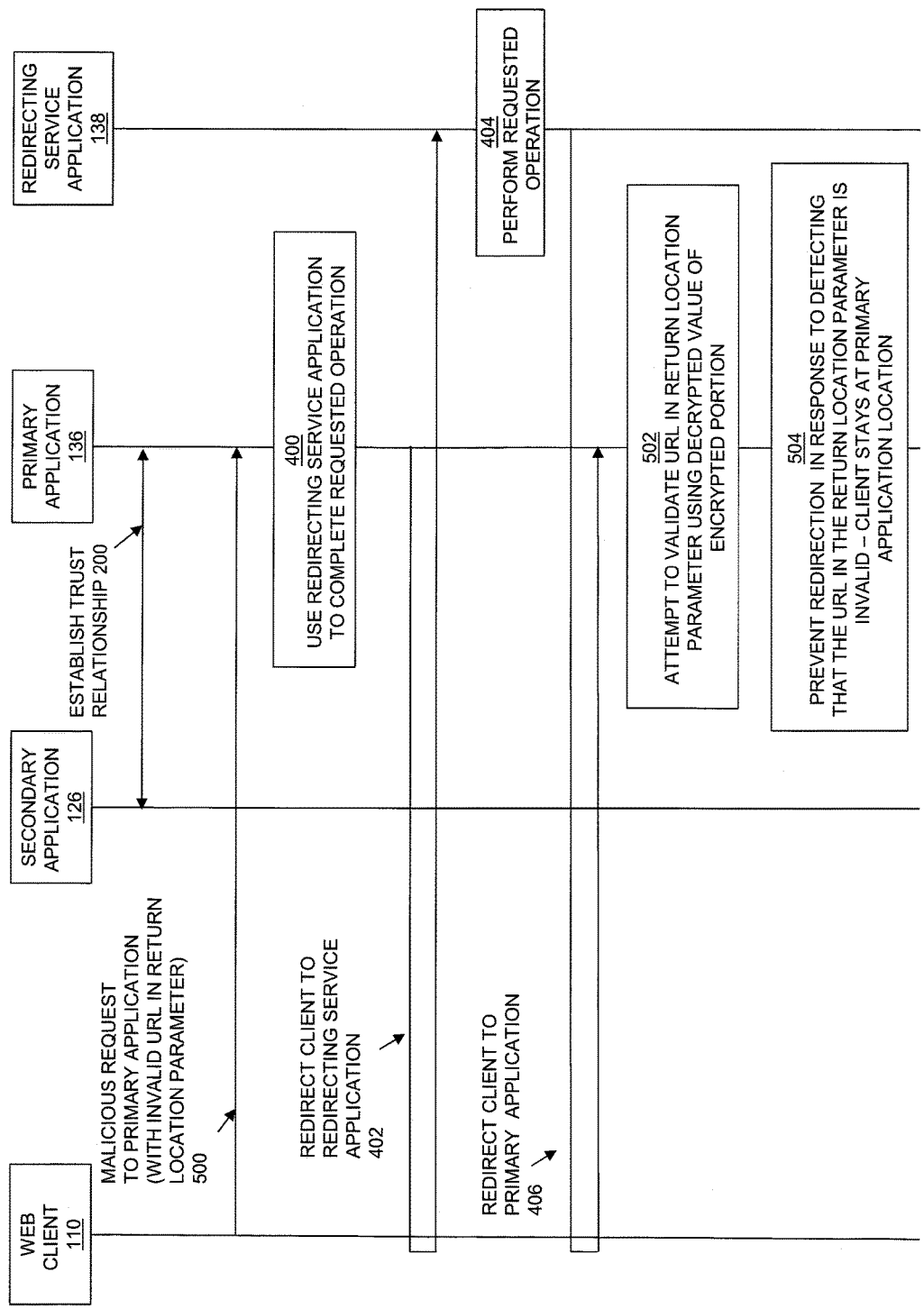
FIG. 5 is a sequence diagram illustrating a fourth example of operation of an illustrative embodiment, in which a redirecting service application is used by the primary application to complete the requested operation, after which a return location (e.g. URL) contained in a return location parameter of a request is determined to be invalid by a primary application using a decrypted value of an encrypted portion of the return location parameter, causing the primary application to prevent sending of a redirect message to the Web client that would redirect the Web client to the return location contained in the return location parameter.

FIG. 5 is a sequence diagram illustrating a fourth example of operation, in which the Redirecting Service Application 138 is used by the Primary Application 136 to complete the requested operation, after which a return location (e.g. URL) contained in the return location parameter of the request received by the Primary Application 136 is determined to be invalid by the Primary Application 136 based on a decrypted value of an encrypted portion of the return location parameter, causing the Primary Application 136 to prevent sending of any redirect message to the Web Client 110 that would redirect the Web Client 110 to a malicious return location (e.g. URL) contained in the return location parameter. As shown in FIG. 5, at 200 a trust relationship is established between Secondary Application 126 and Primary Application 136 as described above with reference to FIG. 1. However, at 500 a malicious request is transmitted from Web Client 110 to Primary Application 136, such as an HTTP GET request message having a return location parameter that contain a return location that is a URL of a Web site that is under the control of an attacker. Steps 400 through 406 are performed as described above with reference to FIG. 4, but then at 502 the Primary Application 136 determines that the malicious return location in the return location parameter is not a valid return location, and is an therefore an "invalid" return location, in response to detecting that the value generated from the malicious return location contained in the return location parameter does not match the decrypted value. As described above, in response to detecting that the value generated from the malicious return location contained in the return location parameter does not match the decrypted value, at 504 Primary Application 136 prevents Web Client 110 from being redirected to the malicious return location, and Web Client 110 remains navigated to the Primary Application 136, such that content provided from Primary Application 136 may be loaded into and displayed by Web Client 110, but no access is provided to the Web site and/or service that is provided by Secondary Application 126. Primary Application 136 may also report the failure to validate the return location to the user of Web Client 110, and/or may add an entry to a log of such failures to validate return locations, and/or store the invalid return location in a "black list" of locations that are believed to be under the control of malicious attackers.

Figure 6:
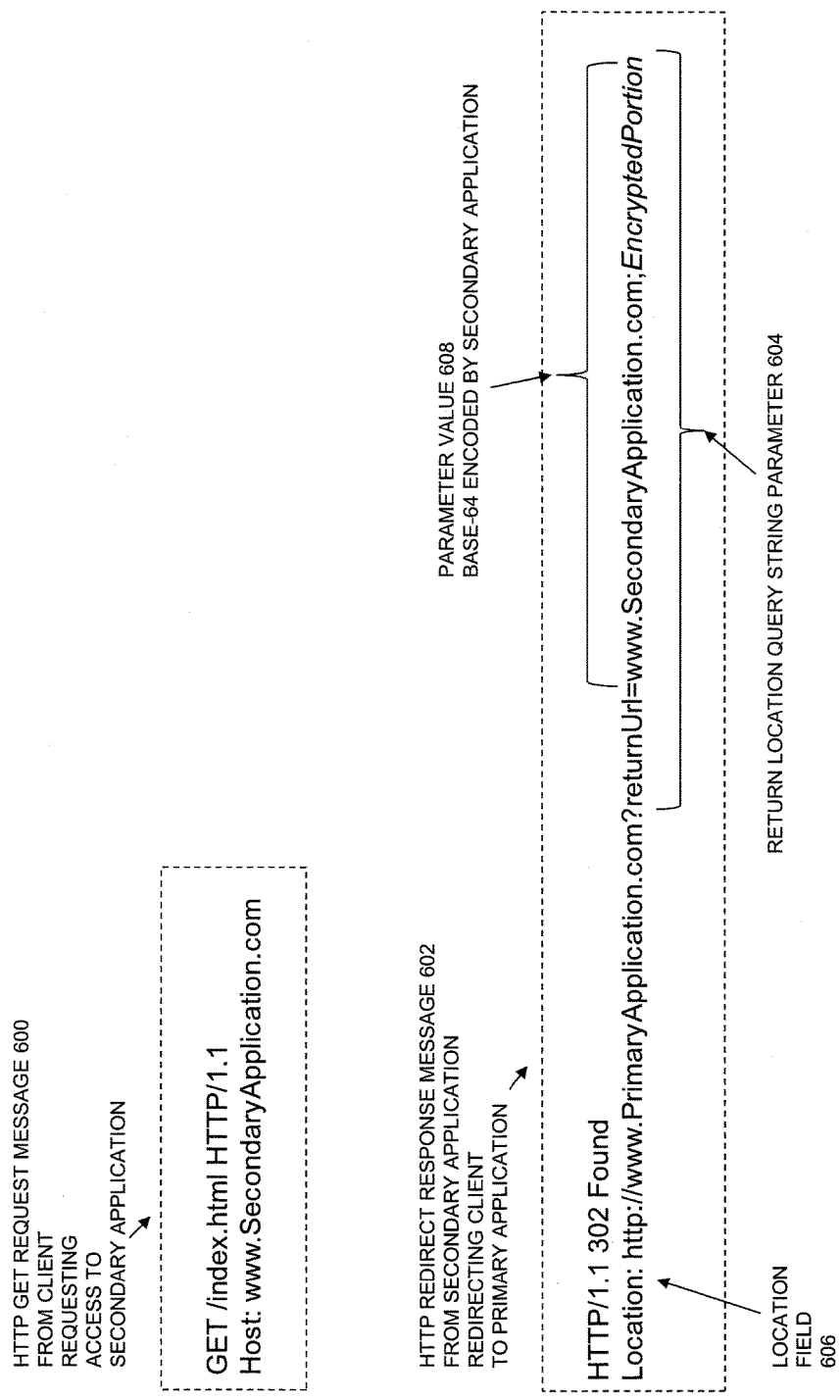
FIG. 6 shows a simplified example of an HTTP request message received from a Web client and requesting access to a secondary application, and an HTTP redirect message causing the Web client to be redirected to the primary application, including a return location parameter containing a return location equal to the URL of the secondary application as and an encrypted portion that was encrypted by the secondary application using the private key uniquely associated with the secondary application.

FIG. 6 shows a simplified example of an HTTP GET Request Message 600, such as may be received by Secondary Application 126 at 202 in FIG. 2 or FIG. 4, that is sent by Web Client 110 to request access to the Web site and/or service provided by Secondary Application 126. In the example of FIG. 6, the HTTP GET Request Message 600 includes a Host field value containing the URL of Secondary Application 126, e.g. "www.SecondaryApplication.com".

FIG. 6 also shows an example of an HTTP Redirect Response Message 602, such as may be sent by Secondary Application 126 to Web Client 126 at 206 in FIG. 2 or FIG. 4 to redirect Web Client 110 to Primary Application 136. In the example of FIG. 6, the HTTP Redirect Response Message 602 has a status code of "302 Found", indicating that it is a redirect response message. The HTTP Redirect Response Message 602 in the example of FIG. 6 further shows a Location Field 606, which includes a URL to which Web Client 110 is to be redirected. The URL in Location Field 606 includes the URL of Primary Application 136 (e.g. "www.PrimaryApplication.com"), with a query string following the "?" separator. The query string includes an example of a return location parameter, shown by Return Location Query String Parameter 604. Return Location Query String Parameter 604 includes a parameter name of "returnURL", followed by "=", which is followed by Parameter Value 608, which may be base-64 encoded by the Secondary Application 126. Parameter Value 608 is shown containing a return location equal to the URL of Secondary Application 126 (e.g. "www.SecondaryApplication"), followed by ";", which is followed by an encrypted portion, shown for purposes of illustration as EncryptedPortion.

In response to receiving the HTTP Redirect Response Message 602 at 206 in FIG. 2 or FIG. 4, the Web Client 110 transmits an HTTP GET request message to Primary Application containing the URL from the Location Field 606 of HTTP Redirect Response Message 602 in its Host field, including the Return Location Query String Parameter 604. Those skilled in the art will further recognize that the URL from the Location Field 606 of HTTP Redirect Response Message 602 may further include an indication of the one or more operations to be performed on behalf of Secondary Application 126.

While the HTTP Redirect Response Message 602 is a specific example of how Web Client 110 may be redirected at step 206, those skilled in the art will recognize that the other redirections of Web Client 110 that are performed at steps 210, 402, 406, and 410 may be accomplished using other specific HTTP redirect response messages that also have a status code of "302 Found".

The specific format of the return location parameter is not limited to the specific example shown in FIG. 6, as various other formats may be used in the alternative as may be appropriate for other specific embodiments.

Figure 7:
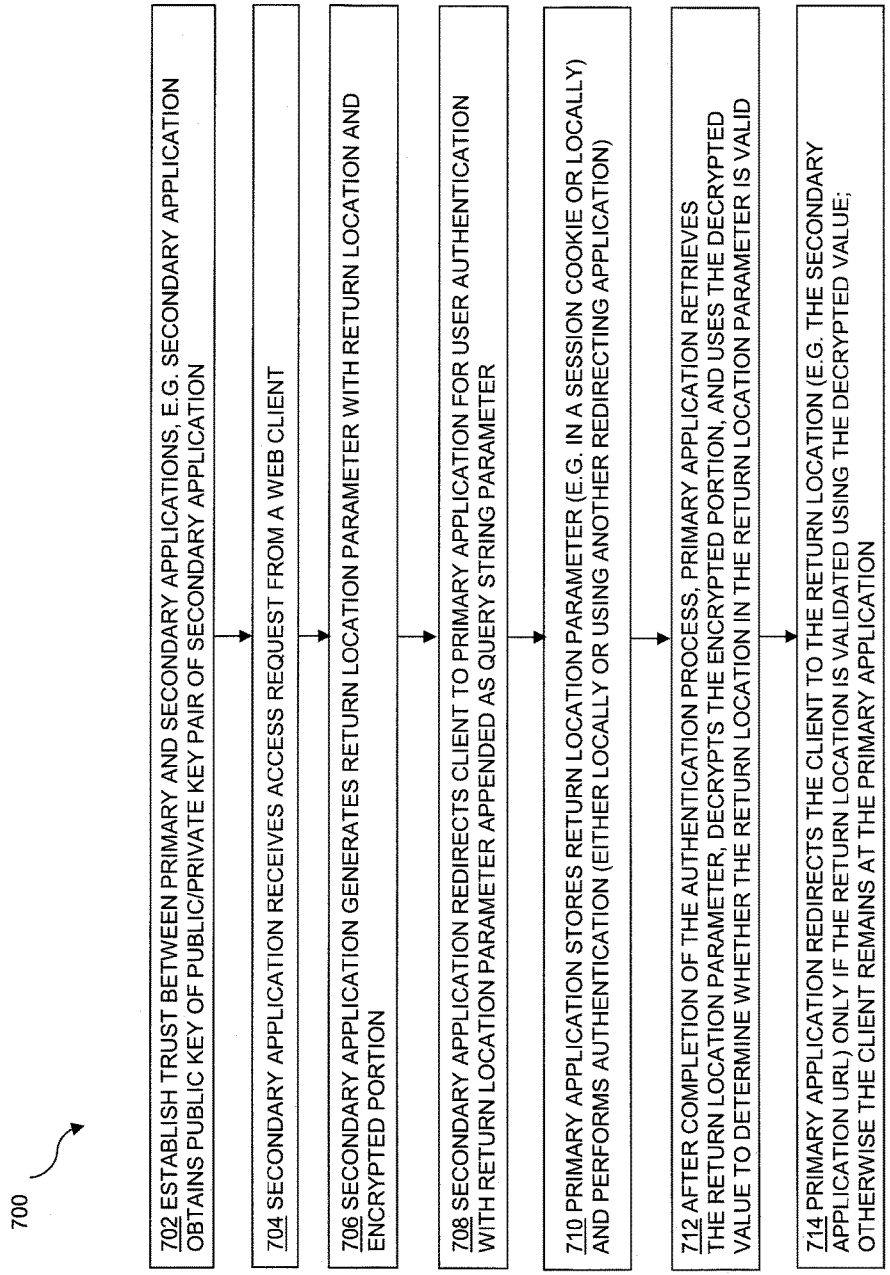
FIG. 7 shows a flow chart of steps performed during operation of an illustrative embodiment.

FIG. 7 shows a flow chart of steps performed during operation of an illustrative embodiment. In step 702, a trust relationship is established between one or more secondary applications and a primary application. For example, one or more secondary applications may register with a primary application to establish trust with the primary application, e.g. resulting in each one of the secondary applications storing the only copy of a private key of a public/private cryptographic key pair uniquely assigned to the secondary application, while the corresponding public key of each key pair is stored in the primary application. Each one of the public/private key pairs may, for example be generated by the primary application at the time a respective one of the secondary applications registers with the primary application.

In step 704 a secondary application that has previously established a trust relationship with the primary application receives an access request from a Web client, such as an HTTP GET request message. In step 706, in response to receipt of the access request in step 704, the secondary application generates a return location parameter that contains a return location and an encrypted portion. For example, the return location in the return location parameter may contain a URL of the secondary application. The encrypted portion of the return location parameter may be generated by the secondary application, for example by using the private key of the public/private key pair uniquely assigned to the secondary application to encrypt the result of applying a predetermined function to the URL of the secondary application. In step 708 the secondary application redirects the Web client to the primary application for the primary application to perform one or more operations on behalf of the secondary application, such as user authentication. The redirect message used to redirect the Web client to the primary application in step 708 may, for example, have a status code of "302 Found", and include the return location parameter generated in step 706 as a query string parameter appended to the URL of the primary application in the Location field of the message.

In step 710, the primary application receives a request message (e.g. an HTTP Get request message) resulting from the Web client having been redirected to the primary application in step 708. The primary application then extracts the location parameter from the query string in the URL in the Host field of the request message, and stores the extracted location parameter such that it can subsequently be retrieved (e.g. either locally or in a session cookie or the like stored in the Web client). Also in step 710 the primary application performs the requested operation or operations on behalf of the secondary application, either internally or using a separate and independent redirecting service application (e.g. by redirecting the Web client to the separate and independent redirecting service application).

Step 712 is performed after completion of the requested operation or operations, either after internal completion of the requested operation or operations, or after the Web client is redirected to the primary application after completion of the requested operation or operations by the redirecting service application. In step 712 the primary application retrieves the previously stored return location parameter, and then generates a decrypted value by decrypting the encrypted portion of the return location parameter using a public key of a public/private key pair uniquely assigned to the secondary application. The primary application then uses the decrypted value to determine whether the return location in the return location parameter is a valid return location, by comparing the decrypted value to a value generated from the return location contained in the retrieved return location parameter (e.g. by application of the predetermined function to the return location). At step 714, the primary application only redirects the client to the return location from the return location parameter (e.g. to the URL of the secondary application) if the return location is validated, i.e. in response to the decrypted value matching the value generated from the return location contained in the retrieved return location parameter. Otherwise, if the value generated from the return location in the retrieved return location parameter does not match the decrypted value, then the return location is invalid, and the primary application prevents the Web client from being redirected to the return location. In the case where the return location is determined to be invalid, the Web client remains navigated to the primary application, and content may be provided to the Web client from the primary application, but no access is provided to the Web client with regard to the Web site and/or service provided by the secondary application.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

Aspects of the technologies disclosed herein may be embodied as a system, method or computer program product. Accordingly, described elements may be embodied using hardware, software (including firmware, resident software, micro-code, etc.) or a combination of software and hardware. Furthermore, aspects of the embodiments illustrated herein may take the form of a computer program product embodied at least in part in one or more non-transitory computer readable storage medium(s) having computer readable program code stored thereon for causing one or more processors and/or a computer system to carry out those aspects.

Any combination of one or more non-transitory computer readable storage medium(s) may be utilized. Examples of a non-transitory computer readable storage medium include, but are not limited to, an optical disc (e.g. CD or DVD), an optical storage device, a magnetic disk, a magnetic storage device, a random access memory (RAM), a read-only memory (ROM), an erasable programmable read-only memory (EPROM or Flash memory), and/or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

It will be understood by those of ordinary skill in the art that modification to and variation of the illustrated embodiments may be made without departing from the inventive concepts described herein.

What is claimed is:

1. A method of protecting Web clients in a computer network from open redirect security vulnerabilities, comprising:
    transmitting, by a secondary application to a Web client, a redirect message containing a URL of a primary application, the URL of the primary application having a return location parameter appended thereto as a query string parameter, the return location parameter containing a return location and an encrypted portion;
    transmitting, by the Web client to the primary application in response to the redirect message, a request to perform an operation on behalf of the secondary application, wherein the request includes the return location parameter;
    receiving, by the primary application from the Web client, the request to perform the operation on behalf of the secondary application;
    storing, by the primary application in response to the request to perform the operation on behalf of the second application, the return location parameter from the request;
    in response to detecting completion of the requested operation by the primary application
        i) retrieving the stored return location parameter,
        ii) retrieving a cryptographic key that is uniquely assigned to the secondary application,
        iii) generating a decrypted value by decrypting the encrypted portion of the return location parameter using the cryptographic key uniquely assigned to the secondary application,
        iv) using the decrypted value to determine whether the return location contained in the return location parameter is valid by comparing the decrypted value to a value generated from the return location contained in the return location parameter, wherein the return location contained in the return location parameter is determined to be valid in response to the decrypted value matching the value generated from the return location contained in the return location parameter, and
        v) preventing the Web client from being redirected to an invalid location, by transmitting a redirect message from the primary application to the Web client that causes the Web client to be redirected to the return location contained in the return location parameter in response to detecting that the decrypted value matches the value generated from the return location contained in the return location parameter.

2. The method of claim 1, wherein the return location contained in the return location parameter comprises a uniform resource locator (URL) of the secondary application;
    wherein the cryptographic key uniquely assigned to the secondary application comprises a public key of a public/private key pair uniquely assigned to the secondary application; and
    wherein the encrypted portion of the return location parameter is encrypted by the secondary application using a private key of the public/private key pair uniquely assigned to the secondary application.

3. The method of claim 2, further comprising, prior to receipt of the request to perform the operation on behalf of the secondary application:
    generating, within the primary application, the public/private key pair that is uniquely assigned to the secondary application;
    transmitting the private key of the public/private key pair that is uniquely assigned to the secondary application to the secondary application; and
    destroying all copies of the private key of the public/private key pair that is uniquely assigned to the secondary application that are stored in the primary application.

4. The method of claim 3, further comprising:
    receiving, by the primary application from the secondary application, a registration request; and
    wherein generating the public/private key pair that is uniquely assigned to the secondary application by the primary application is performed in response to receiving the registration request from the secondary application.

5. The method of claim 4, further comprising generating the value generated from the return location contained in the return location parameter by applying a predetermined function to the return location contained in the return location parameter; and
    wherein the encrypted portion of the return location parameter comprises a result of the secondary application encrypting, using the primary key of the public/private key pair that is uniquely assigned to the secondary application, a result of applying the predetermined function to the uniform resource locator of the secondary application.

6. The method of claim 5, wherein the predetermined function comprises a predetermined hash function;
    wherein generating the value generated from the return location contained in the return location comprises applying the predetermined hash function to the return location contained in the return location parameter; and
    wherein the encrypted portion of the return location parameter comprises a result of the secondary application encrypting, using the primary key of the public/private key pair that is uniquely assigned to the secondary application, a result of applying the predetermined hash function to the uniform resource locator of the secondary application.

7. The method of claim 6, wherein the primary application performs the requested operation by transmitting a redirect message from the primary application to the Web client that causes the Web client to be redirected to a redirecting service application, wherein the redirect message transmitted from the primary application to the Web client that causes the client to be redirected to the redirecting service application includes a return location parameter that contains a return location equal to a uniform resource locator of the primary application; and wherein the primary application detects completion of the request operation in response to the redirecting service application causing the Web client to be redirected to the primary application.

8. The method of claim 7, wherein storing the return location parameter from the request by the primary application comprises the primary application storing the return location parameter within a session cookie that is stored in the Web client; and wherein retrieving the stored return location parameter comprises retrieving the session cookie when the redirecting service application causes the Web client to be redirected to the primary application.

9. The method of claim 8, wherein the secondary application provides a Web page;

wherein the secondary application receives a request from the Web client to access the Web page provided by the secondary application;

wherein the secondary application redirects the Web client to the primary application in response to receiving the request from the Web client to access the Web page provided by the secondary application; and wherein the operation to be performed on behalf of the secondary application comprises authenticating a user of the Web client prior to allowing the Web client to access the Web page provided by the secondary application.

10. A system for protecting Web clients in a computer network from open redirect security vulnerabilities, comprising:

a secondary server having processing circuitry and memory communicably coupled to the processing circuitry, the memory storing program code of a secondary application, wherein the program code of the secondary application, when executed by the processing circuitry of the secondary server, causes the processing circuitry of the secondary server to:
transmit, to a Web client, a redirect message containing a URL of a primary application, the URL of the primary application having a return location parameter appended thereto as a query string parameter, the return location parameter containing a return location and an encrypted portion, the redirect message causing the Web client to transmit a request to perform an operation on behalf of the secondary application to a primary application, the request including the return location parameter;

a primary server having processing circuitry and memory communicably coupled to the processing circuitry, the memory storing program code of the primary application, wherein the program code of the primary application, when executed by the processing circuitry of the primary server, causes the processing circuitry of the primary server to:
receive, from the Web client, the request to perform the operation on behalf of the secondary application;
store, in response to receipt of the request, the return location parameter from the request; and
in response to detection of the completion of the requested operation,
i) retrieve the stored return location parameter,
ii) retrieve a cryptographic key that is uniquely assigned to the secondary application,
iii) generate a decrypted value by decrypting the encrypted portion of the return location parameter using the cryptographic key uniquely assigned to the secondary application,
iv) use the decrypted value to determine whether the return location contained in the return location parameter is valid by comparing the decrypted value to a value generated from the return location contained in the return location parameter, wherein the return location contained in the return location parameter is determined to be valid in response to the decrypted value matching the value generated from the return location contained in the return location parameter, and
v) prevent the Web client from being redirected to an invalid location, by transmitting a redirect message from the primary application to the Web client that causes the Web client to be redirected to the return location contained in the return location parameter in response to detecting that the decrypted value matches the value generated from the return location contained in the return location parameter.

11. The system of claim 10, wherein the return location contained in the return location parameter comprises a uniform resource locator (URL) of the secondary application;

wherein the cryptographic key uniquely assigned to the secondary application comprises a public key of a public/private key pair uniquely assigned to the secondary application; and wherein the encrypted portion of the return location parameter is encrypted by the secondary application using a private key of the public/private key pair uniquely assigned to the secondary application.

12. The system of claim 11, wherein the program code of the primary application, when executed by the processing circuitry of the primary server, further causes the processing circuitry of the primary server to, prior to receipt of the request to perform the operation on behalf of the secondary application:
generate the public/private key pair that is uniquely assigned to the secondary application;
transmit the private key of the public/private key pair that is uniquely assigned to the secondary application to the secondary application; and
destroy all copies of the private key of the public/private key pair that is uniquely assigned to the secondary application that are stored in the primary application.

13. The system of claim 12, wherein the program code of the primary application, when executed by the processing circuitry of the primary server, causes the processing circuitry of the primary server to further:
receive from the secondary application a registration request; and
generate the public/private key pair that is uniquely assigned to the secondary application in response to receiving the registration request from the secondary application.

14. The system of claim 13, wherein the program code of the primary application, when executed by the processing circuitry of the primary server, further causes the processing circuitry of the primary server to generate the value generated from the return location contained in the return location parameter by applying a predetermined function to the return location contained in the return location parameter; and wherein the encrypted portion of the return location parameter comprises a result of the secondary application encrypting, using the primary key of the public/private key pair that is uniquely assigned to the secondary application, a result of applying the predetermined function to the uniform resource locator of the secondary application.

15. The system of claim 14, wherein the predetermined function comprises a predetermined hash function, and wherein the program code of the primary application, when executed by the processing circuitry of the primary server, further causes the processing circuitry of the primary server to:

generate the value generated from the return location contained in the return location at least in part by applying the predetermined hash function to the return location contained in the return location parameter; and wherein the encrypted portion of the return location parameter comprises a result of the secondary application encrypting, using the primary key of the public/private key pair that is uniquely assigned to the secondary application, a result of applying the predetermined hash function to the uniform resource locator of the secondary application.

16. The system of claim 15, wherein the program code of the primary application, when executed by the processing circuitry of the primary server, further causes the processing circuitry of the primary server to:

perform the requested operation by transmitting a redirect message from the primary application to the Web client that causes the Web client to be redirected to a redirecting service application, wherein the redirect message transmitted from the primary application to the Web client that causes the client to be redirected to the redirecting service application includes a return location parameter that contains a return location equal to a uniform resource locator of the primary application; and detect completion of the requested operation when the redirecting service application causes the Web client to be redirected to the primary application.

17. The system of claim 16, wherein the program code of the primary application, when executed by the processing circuitry of the primary server, further causes the processing circuitry of the primary server to:

store the return location parameter from the request by the primary application comprises the primary application by storing the return location parameter within a session cookie that is stored in the Web client; and retrieve the stored return location parameter by retrieving the session cookie when the redirecting service application causes the Web client to be redirected to the primary application.

18. The system of claim 17, wherein the request to perform the operation on behalf of the secondary application that is received by the primary application comprises a request generated by the Web client in response to the secondary application redirecting the Web client to the primary application in response to the secondary application receiving a request from the Web client to access a Web page provided by the secondary application; and wherein the operation to be performed by the primary application on behalf of the secondary application comprises authenticating a user of the Web client prior to allowing the Web client to access the Web page provided by the secondary application.

19. A non-transitory computer readable medium storing program code for protecting Web clients in a computer network from open redirect security vulnerabilities, wherein the program code, when executed by at least one processor, causes the processor to perform a method of:

transmitting, by a secondary application to a Web client, a redirect message containing a URL of a primary application, the URL of the primary application having a return location parameter appended thereto as a query string parameter, the return location parameter containing a return location and an encrypted portion;

transmitting, by the Web client to the primary application in response to the redirect message, a request to perform an operation on behalf of the secondary application, wherein the request includes the return location parameter;

receiving, by the primary application from the Web client, the request to perform the operation on behalf of the secondary application;

storing, by the primary application in response to receiving the request to perform the operation on behalf of the second application, the return location parameter from the request; and in response to detecting completion of the requested operation, the primary application
i) retrieving the stored return location parameter,
ii) retrieving a cryptographic key that is uniquely assigned to the secondary application,
iii) generating a decrypted value by decrypting the encrypted portion of the return location parameter using the cryptographic key uniquely assigned to the secondary application,
iv) using the decrypted value to determine whether the return location contained in the return location parameter is valid by comparing the decrypted value to a value generated from the return location contained in the return location parameter, wherein the return location contained in the return location parameter is determined to be valid in response to the decrypted value matching the value generated from the return location contained in the return location parameter, and
v) preventing the Web client from being redirected to an invalid location, by transmitting a redirect message from the primary application to the Web client that causes the Web client to be redirected to the return location contained in the return location parameter in response to detecting that the decrypted value matches the value generated from the return location contained in the return location parameter.

* * * * *